United States Patent
Maguire et al.

(10) Patent No.: US 7,491,151 B2
(45) Date of Patent: Feb. 17, 2009

(54) SELECTABLE ONE-WAY CLUTCH CONTROL

(75) Inventors: Joel M. Maguire, Northville, MI (US); Scott H. Wittkopp, Ypsilanti, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 320 days.

(21) Appl. No.: 11/263,179

(22) Filed: Oct. 31, 2005

(65) Prior Publication Data

US 2007/0099758 A1   May 3, 2007

(51) Int. Cl.
    *B60W 10/06* (2006.01)
(52) U.S. Cl. ..................................... 477/107
(58) Field of Classification Search ............... 477/107
    See application file for complete search history.

(56) References Cited

U.S. PATENT DOCUMENTS

| | | | | |
|---|---|---|---|---|
| 5,020,391 A | * | 6/1991 | Aoki et al. | 477/143 |
| 5,772,554 A | * | 6/1998 | Tabata | 477/109 |
| 7,089,102 B2 | * | 8/2006 | Slayton et al. | 701/51 |
| 2003/0119623 A1 | * | 6/2003 | Stevenson et al. | 475/275 |
| 2004/0060794 A1 | * | 4/2004 | Li et al. | 192/43.1 |

* cited by examiner

*Primary Examiner*—Dirk Wright
*Assistant Examiner*—Derek D Knight

(57) ABSTRACT

The present invention provides a method for controlling a selectable one-way clutch, or SOWC, such that engine braking is enabled. Additionally, the method of the present invention is adapted to provide engine braking using the SOWC such that a separate clutch is not required. The method is initiated by identifying a downshift command. After the downshift command has been identified, the off-going clutch associated with the current speed ratio is released. Engine speed is preferably increased to bring the relative speed across a selectable one-way clutch to approximately zero. Thereafter, the selectable one-way clutch is engaged such that is capable of holding torque in both directions. As the selectable one-way clutch can hold torque in both directions, torque is transmittable from the transmission to the engine and engine braking is thereby enabled.

17 Claims, 3 Drawing Sheets

SELECTABLE ONE-WAY CLUTCH CONTROL

TECHNICAL FIELD

The present invention relates to a method for controlling a one-way clutch to allow engine braking.

BACKGROUND OF THE INVENTION

Automatic transmissions generally effect a ratio change by altering the power delivery path after selective actuation of one or more friction elements. It is common to provide a one-way clutch configured to transfer torque from an engine to the transmission, and to interrupt the transfer of reverse torque from the transmission to the engine. However, the interruption of the transfer of reverse torque to the engine also precludes engine braking. "Engine braking" is a method for decelerating a vehicle using engine compression so that energy is dissipated without exclusively relying on conventional friction based brake systems. Therefore, implementation of engine braking in combination with a conventional friction based brake system increases the lifespan of the conventional brake system by reducing wear and heat generation.

SUMMARY OF THE INVENTION

The present invention relates to a method for controlling a selectable one-way clutch, or SOWC, such that engine braking is enabled. Additionally, the method of the present invention is adapted to provide engine braking using the SOWC such that a separate clutch is not required.

The method of the present invention initiates when a downshift command is identified. The downshift command is preferably generated in response to an operator shifting from drive to a manual gear. As used herein, a "manual gear" refers to one of the manually selectable gear ratios such as D1, D2 or D3. For exemplary purposes, the shift from drive to a manual gear will hereinafter be described as a downshift from $2^{nd}$ gear to a manual first gear (i.e., a 2-D1 downshift). It should, however, be appreciated that the method of the present invention may also be applied to other downshifts such as, for example, a 4-D3 or 3-D2 downshift. After the downshift command has been identified, an off-going clutch is released. Referring to the example wherein the downshift is a 2-D1 downshift, the off-going clutch associated with the $2^{nd}$ gear speed ratio is released.

According to a preferred embodiment, the present invention uses engine throttle to set the relative speed across the SOWC to approximately zero before the SOWC is actuated. The relative speed at which the SOWC is actuated is set at approximately zero to limit the amount of impact load adsorbed by the SOWC. It has been observed that reducing the impact load in this manner provides a smoother shift such that there are no objectionable noises or forces transferred to the operator.

When the relative speed across the SOWC reaches approximately zero, the SOWC is actuated or "locked-up" such that it holds torque in both clockwise and counter-clockwise directions. As the SOWC is configured to hold torque in both directions, torque is transmittable from the transmission to the engine thereby producing engine braking.

According to one aspect of the invention, electronic throttle control, or ETC, is implemented to set the relative speed across the SOWC to approximately zero.

According to another aspect of the invention, the SOWC is hydraulically engaged.

According to yet another aspect of the invention, the relative speed across the SOWC is identifiable using a transmission input speed sensor and a transmission output speed sensor.

According to still another aspect of the invention, the SOWC is mechanically released.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

The present invention provides a method for controlling a selectable one-way clutch, or SOWC, such that engine braking is enabled. Additionally, the method of the present invention is adapted to provide engine braking using the SOWC such that a separate clutch is not required.

Figure 1:
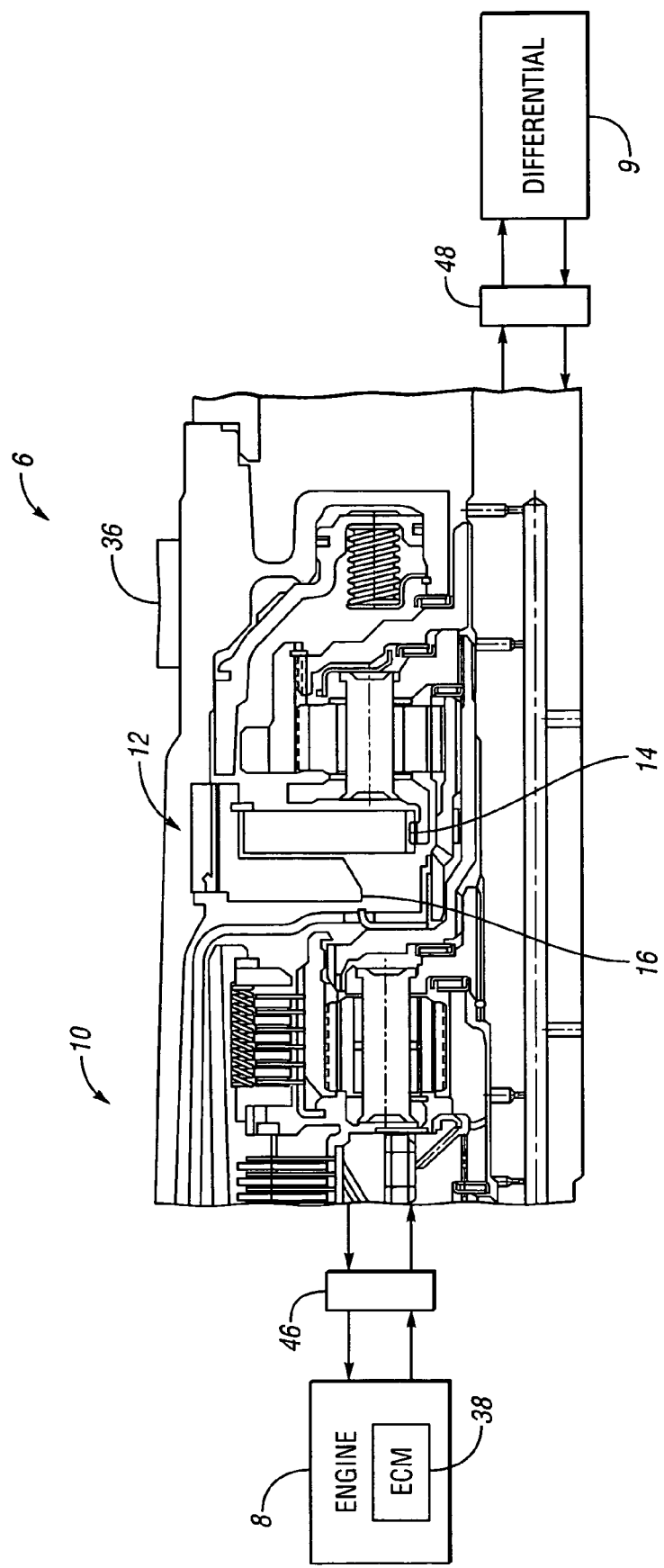
FIG. 1 is a schematic diagram of a vehicle according to the present invention.

Referring to the drawings, wherein like reference numbers refer to like components, FIG. 1 shows a vehicle 6 including an engine 8, a differential 9, and a transmission 10. The transmission 10 includes a SOWC 12. According to a preferred embodiment of the present invention, the SOWC 12 is a mechanical diode based SOWC. It should be appreciated, however, that according to alternate embodiments the mechanical diode based SOWC 12 may be replaced with other selectable one-way clutches. A transmission input speed sensor 46 is preferably disposed within the transmission 10 to measure the transmission input speed. A transmission output speed sensor 48 is preferably disposed between the transmission 10 and the differential 9 to measure the transmission output speed.

Figure 2:
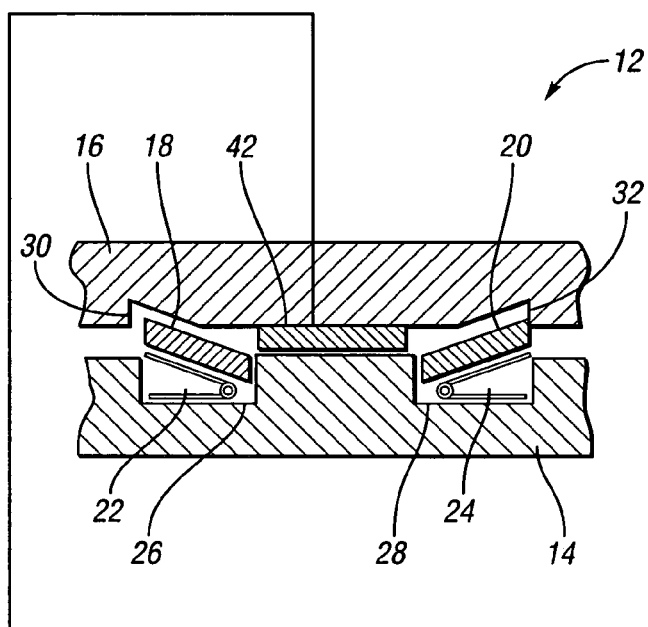
FIG. 2 is a schematic partial cross-sectional view of a selectable one-way clutch according to the present invention.
Figure 2:
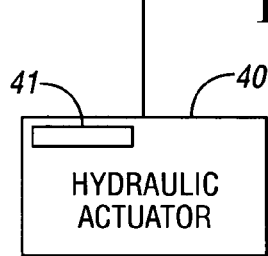

As shown in FIG. 2, the SOWC 12 includes a first and second race 14, 16; first and second struts 18, 20; and first and second springs 22, 24. The first race 14 and second race 16 are configured to selectively either spin relative to each other (i.e., freewheel), or lock-up and rotate as a single unit. The first race 14 defines first and second recessed portions 26, 28 adapted to respectively retain first and second struts 18, 20, and first and second springs 22, 24. The second race 16 defines first and second engagement shoulders 30, 32 each adapted to engage one of the first and second struts 18, 20 to lock-up the clutch 12.

When the first and second springs 22, 24 are in a compressed position, the struts 18, 20 are retracted within the recessed portions 26, 28 of the race 14 such that the shoulders 30, 32 are not engaged and the clutch 12 freewheels in both clockwise and counter-clockwise directions. When the first and second springs 22, 24 are in an extended position, the struts 18, 20 protract from their respective recessed portions 26, 28, and respectively engage the first and second engagement shoulders 30, 32 such that the clutch 12 locks-up in both clockwise and counter-clockwise directions. Additionally, by compressing one of the springs 22, 24 and extending the other, the clutch 12 can be locked-up in one direction and freewheel in the opposite direction.

The springs 22, 24 are configured to push the struts 18, 20 into engagement with the shoulders 30, 32 such that in the steady state position the SOWC 12 is locked-up in both directions. Therefore, for purposes of releasing the SOWC 12, a selector plate 42 is provided. The selector plate 42 is adapted to selectively translate and engage one of the struts 18, 20 such that the engaged strut is pushed toward its respective recessed portion 26, 28 and out of engagement with its respective shoulder 30, 32. As an example, the selector plate 42 may be translated into engagement with strut 18 thereby compressing the spring 22 and retracting the strut 18 out of engagement with the shoulder 30 such that race 16 is rotatable in a clockwise direction relative to race 14. Conversely, the selector plate 42 may be translated into engagement with strut 20 thereby compressing the spring 24 and retracting the strut 20 out of engagement with the shoulder 32 such that race 16 is rotatable in a counter-clockwise direction relative to race 14.

According to a preferred embodiment, the selector plate 42 is hydraulically translatable using a conventional hydraulic device such as the hydraulic actuator 40. The hydraulic actuator 40 includes a return spring 41 adapted to push the selector plate 42 into engagement with one of the struts 18, 20 such that SOWC 12 is mechanically biased into a one-way operational mode. Hydraulic actuation of the selector plate 42 by the actuator 40 overcomes the return spring 41 and translates the selector plate 42 into a position between the struts 18, 20 such that the SOWC 12 is locked in both directions. In this manner, the SOWC 12 is hydraulically engaged with the actuator 40 and mechanically released with the return spring 41.

Figure 3:
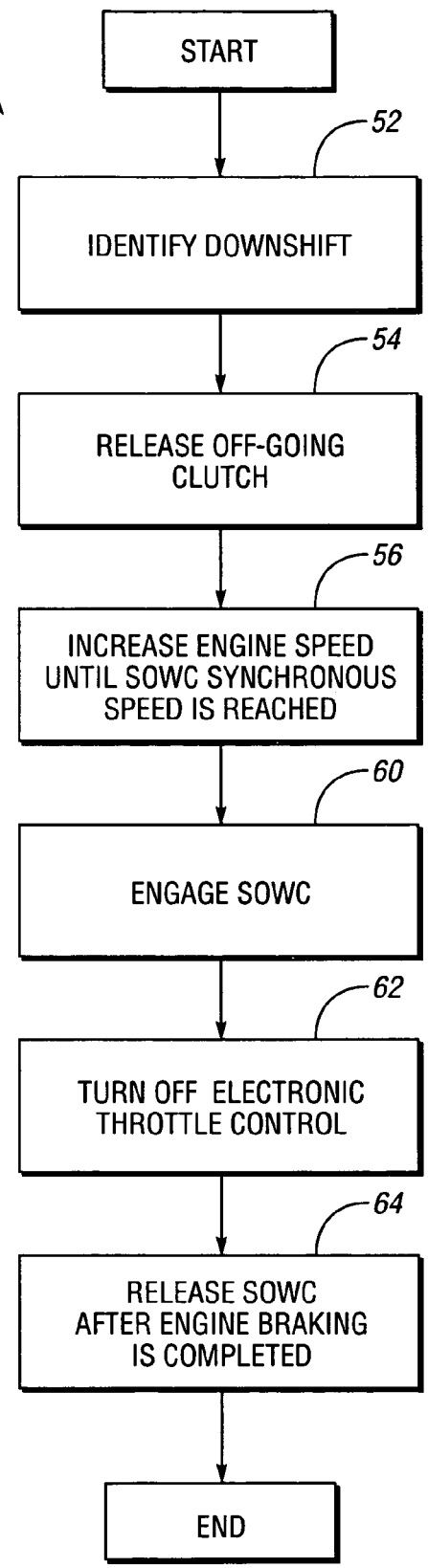
FIG. 3 is flow chart illustrating a method of the present invention.

For purposes of this disclosure, a preferred method 50 (also referred to herein as algorithm 50) for producing engine braking with a SOWC is shown in FIG. 3. It should, however, be appreciated that alternate methods for implementing a SOWC to produce engine braking may be envisioned. The block diagram depicted in FIG. 3 represents steps performed by a control module such as the transmission control module 36, or TCM 36 (shown in FIG. 1).

Referring to FIG. 3, the preferred method 50 is configured at step 52 to identify an operator commanded downshift from drive to a manual gear ratio such as D1, D2 or D3. For exemplary purposes, the downshift from drive to a manual gear ratio will hereinafter be described as a downshift from $2^{nd}$ gear to a manual first gear (i.e., a 2-D1 downshift). It should be appreciated, however, that the method 50 of the present invention may also be applied to other downshifts such as, for example, a 4-D3 or 3-D2 downshift. If a 2-D1 downshift has been commanded, the algorithm 50 proceeds to step 54. At step 54, the second gear off-going clutch 92 (shown in FIG. 4) is released to initiate the 2-D1 downshift. At step 56, engine speed is increased as will be described in detail hereinafter.

Step 56, at which engine speed is increased, is preferably performed with electronic throttle control, or ETC. More precisely, the TCM 36 (shown in FIG. 1) sends a signal commanding an engine control module 38, or ECM 38 (shown in FIG. 1), to electronically increase engine output. Step 56 is preferably implemented to quickly bring the SOWC 12 to a synchronous speed at which the relative speed across the SOWC 12 is zero. The relative speed across the SOWC 12 is defined for purposes of the present invention as the speed of the first race 14 relative to the speed of the second race 16. The synchronous speed of the SOWC 12 is preferably identified by measuring the transmission input and output speeds with speed sensors 46, 48 (shown in FIG. 1), identifying the current transmission gear state, and calculating the speeds of the first and second races 14, 16 (shown in FIGS. 1 and 2) using a lever diagram such as those shown in FIGS. 5a-5c.

At step 60, after the synchronous speed of the SOWC 12 (shown in FIG. 1) has been reached, the SOWC 12 is engaged or locked-up such that the SOWC 12 can hold torque in both directions. Engagement of the SOWC 12 at a synchronous speed advantageously limits the amount of impact load adsorbed by the SOWC 12. It has been observed that reducing the impact load in this manner provides a smoother shift such that there are no objectionable noises or forces transferred to the operator. Referring to FIG. 2, the SOWC 12 is engaged by translating the selector plate 42 to a position between the levers 18, 20 such that the springs 22, 24 respectively push the levers 18, 20 into engagement with the shoulders 30, 32 and thereby lock-up the SOWC 12 in both directions. According to a preferred embodiment, the selector plate 42 is translated by the hydraulic actuator 40 such that the SOWC 12 is hydraulically engaged.

Referring again to FIG. 3, at step 62, after the SOWC 12 (shown in FIG. 1) is engaged, the ETC applied at step 56 is turned off. After the ETC is off, the engaged SOWC 12 will hold torque in both directions such that engine braking is enabled to slow the vehicle 6. At step 64, after the vehicle 6 is shifted from a manual gear, the SOWC 12 is released. Referring to FIG. 2, the SOWC 12 is released by translating the selector plate 42 into engagement with the lever 20 such that the lever 20 is disengaged from the shoulder 32 and the race 16 is rotatable in a counter-clockwise direction relative to the race 14. According to a preferred embodiment, the selector plate 42 is translated by the return spring 41 such that the SOWC 12 is mechanically released.

For purposes of this disclosure, the transmission 10 will hereinafter be described as the automatic transmission 10 shown schematically in FIG. 4. It should be appreciated, however, that the method of the present invention may be implemented with alternate transmission configurations as well.

Figure 4:
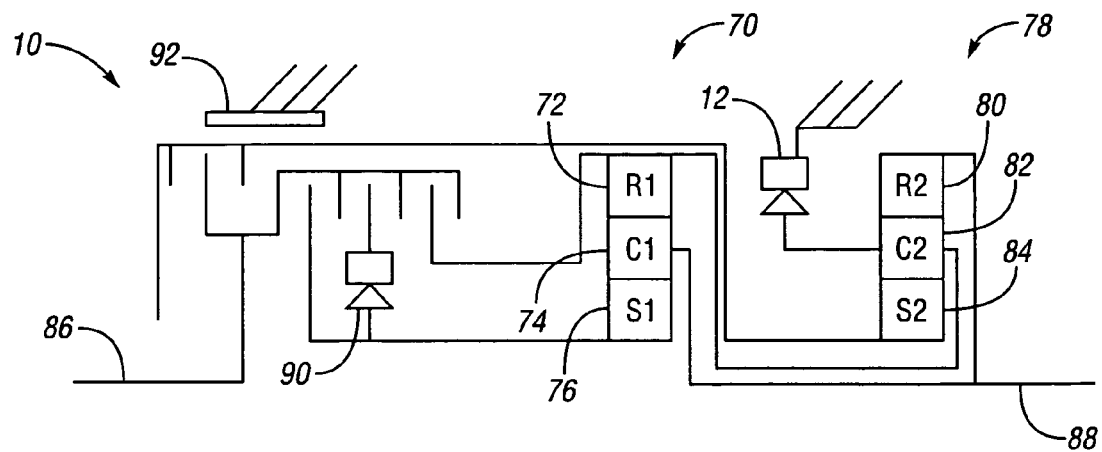
FIG. 4 is a schematic stick diagram of a transmission according to the present invention.

As shown in FIG. 4, the transmission 10 includes a first planetary gear-set 70 including a first ring gear member 72, a first carrier member 74, and a first sun member 76. The transmission 10 also includes a second planetary gear-set 78 including a second ring gear member 80, a second carrier member 82, and a second sun member 84. The transmission includes an input shaft 86 adapted to receive input from the engine 8 (shown in FIG. 1), and an output shaft 88 adapted to transmit output to the differential 9 (shown in FIG. 1). A one-way clutch 90 selectively connects the input shaft 86 to the first sun member 76, the SOWC 12 selectively connects the second carrier member 82 to ground, and a band clutch 92 selectively connects the second sun member 84 to ground.

Figure 5A:
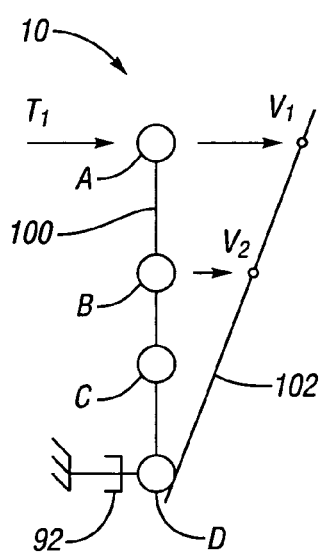
FIG. 5a is a schematic lever diagram illustration of the transmission shown in FIG. 4 with a second gear speed ratio engaged.
Figure 5B:
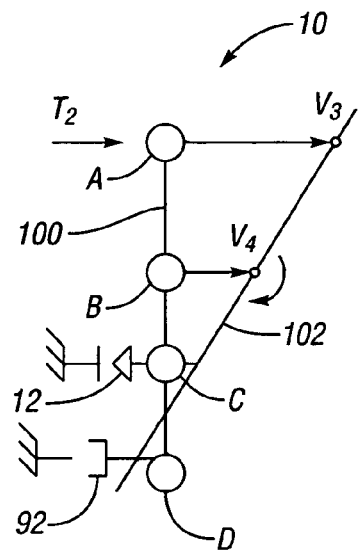
FIG. 5b is a schematic lever diagram illustration of the transmission shown in FIG. 4 during a transition from a second gear speed ratio to a D1 gear speed ratio.
Figure 5C:
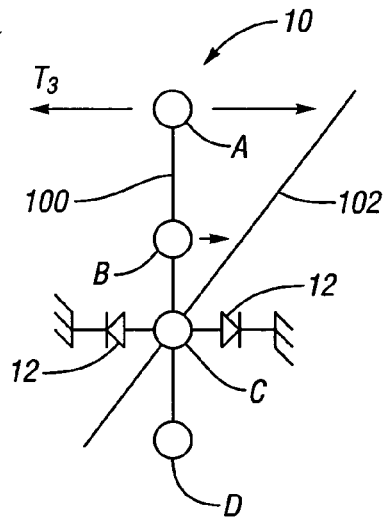
FIG. 5c is a schematic lever diagram illustration of the transmission shown in FIG. 4 with a D1 gear speed ratio engaged.

Referring to FIGS. 5a-5c, the transmission 10 is shown in lever diagram form as will be readily understood by those skilled in the art. More precisely, FIGS. 5a-5c show a series of lever diagrams representing the transmission 10 during a shift from the $2^{nd}$ gear ratio to the D1 gear ratio. The lever diagrams of FIGS. 5a-5c each include a vertical line 100 having a first, second, third and fourth node A, B, C, D, respectively, and a diagonal line 102. The vertical line 100 represents the transmission 10 generally, and the diagonal line 102 represents the rotational velocity of the transmission 10. The nodes A, B, C and D represent planetary gear members, preferably the first sun member 76 (shown in FIG. 4); the first carrier member 74 (shown in FIG. 4); the first ring gear member 72 (shown in FIG. 4); and the second sun member 84 (shown in FIG. 4), although not necessarily in that order.

Referring to FIG. 5a, a lever diagram representing the transmission 10 operating in $2^{nd}$ gear is shown. The clutch 92 is shown engaged thereby grounding node D such that the rotational velocity at node D is zero. A torque T1 applied by the engine 8 (shown in FIG. 1) to the transmission 10 at node A produces a node A rotational velocity V1 and a node B rotational velocity V2. The node B rotational velocity V2 represents the output transferred by the transmission 10 to the differential 9 (shown in FIG. 1).

Referring to FIGS. 5b, a lever diagram representing the transmission 10 during the shift from $2^{nd}$ gear to the D1 gear ratio is shown. To initiate the 2-D1 downshift, the clutch 92 (off-going clutch) is released and an input torque T2 is applied by the engine 8 (shown in FIG. 1) to the transmission 10 at node A. The torque T2 is preferably applied via electronic throttle control as described hereinabove with respect to step 56 of FIG. 3. As the rotational velocity of node C (represented by the diagonal line 102) is not yet zero, the relative speed across the SOWC 12 (shown in FIG. 1) is not yet zero and the SOWC 12 is not actuated.

The torque T2 is preferably applied during the 2-D1 downshift to more quickly bring the node C rotational velocity to zero such that the SOWC 12 can be engaged. This can be seen with reference to FIG. 5b which shows that the torque T3 induces a rotational velocity V3 at node A, and that the induced velocity V3 pushes a top portion of the diagonal velocity line 102 from left to right. The node B rotational velocity labeled V4 also represents the transmission output rotational velocity. The transmission output velocity V4 is fixed such that the induced velocity V3 pivots the diagonal velocity line 102 about the point labeled V4 thereby bringing the node C velocity toward zero.

Referring to FIG. 5c, a lever diagram representing the transmission 10 operating in the D1 gear ratio is shown. When the rotational velocity at node C is approximately zero, the relative speed across the SOWC 12 (shown in FIG. 1) is also approximately zero and the SOWC 12 is locked. It can be seen that after the SOWC 12 is engaged, node C is grounded in both directions such that a torque T3 is transferable from node A to the engine 8 (shown in FIG. 1). It is this transfer of torque T3 to the engine 8, and the corresponding resistance to this transfer of torque T3 by engine compression forces, that provides engine braking to the vehicle 6.

While the best modes for carrying out the invention have been described in detail, those familiar with the art to which this invention relates will recognize various alternative designs and embodiments for practicing the invention within the scope of the appended claims.

The invention claimed is:

1. A method for controlling a selectable one-way clutch (SOWC) that is selectively engageable to connect a member of a planetary gear set to a stationary member of a transmission to thereby allow engine braking of a vehicle, the method comprising:
   identifying a manual downshift command from drive to a manual first gear, the downshift command being generated in response to an operator of the vehicle shifting from drive to the manual first gear;
   releasing an off-going clutch in response to the downshift command;
   increasing an engine speed after releasing the off-going clutch, until a relative speed across the SOWC is approximately zero;
   engaging the SOWC after the relative speed across the SOWC reaches approximately zero to thereby connect the member of the planetary gear set to the stationary member such that minimal impact load is absorbed during engagement of the SOWC, and such that the engine braking is enabled as the vehicle decelerates in the manual first gear.

2. The method of claim 1, wherein said increasing an engine speed includes applying electronic throttle control.

3. The method of claim 2, further comprising turning off said electronic throttle control after the SOWC is engaged.

4. The method of claim 1, wherein said engaging the SOWC includes hydraulically engaging the SOWC such that torque is held across the SOWC in both clockwise and counter-clockwise directions.

5. The method of claim 1, wherein said engaging the SOWC after the relative speed across the SOWC reaches approximately zero includes monitoring a transmission input speed sensor and a transmission output speed sensor.

6. The method of claim 1, further comprising releasing the SOWC after the engine braking is complete.

7. The method of claim 6, wherein said releasing the SOWC includes mechanically releasing the SOWC.

8. A method for controlling a selectable one-way clutch (SOWC) that is selectively engageable to connect a member of a planetary gear set to a stationary member of a transmission to thereby allow engine braking of a vehicle in a manual first gear, the vehicle having a transmission with the stationary member and the planetary gear set including a carrier member, a sun gear member, and a ring gear member, the method comprising:
   identifying a manual downshift command which is generated in response to an operator of the vehicle shifting from drive to the manual first gear;
   releasing an off-going clutch associated with a current gear ratio to thereby disconnect the sun gear member from the stationary member;
   increasing an engine speed after releasing the off-going clutch using electronic throttle control until a relative speed across the SOWC reaches approximately zero;
   engaging the SOWC after the relative speed across the SOWC reaches approximately zero to thereby connect the carrier member to the stationary member such that torque is held in both clockwise and counter-clockwise rotational directions across the SOWC and minimal impact load is absorbed during engagement of the SOWC;
   automatically reducing the engine speed after the SOWC is engaged such that the engine braking is enabled and the vehicle decelerates in the manual first gear.

9. The method of claim 8, further comprising releasing the SOWC after the engine braking is complete to thereby disconnect the carrier member from the stationary member.

10. The method of claim 9, wherein said releasing the SOWC includes mechanically releasing the SOWC.

11. The method of claim 8, wherein said identifying a downshift command includes identifying an operator commanded downshift from second gear in drive to the manual first gear.

12. The method of claim 8, wherein said engaging the SOWC includes hydraulically engaging the SOWC such that torque is held across the SOWC in both clockwise and counter-clockwise directions.

13. The method of claim 8, wherein said increasing an engine speed using electronic throttle control until a relative speed across the SOWC reaches approximately zero includes monitoring a transmission input speed sensor and a transmission output speed sensor.

14. A method for controlling a selectable one-way clutch (SOWC) that is selectively engageable to connect a carrier member of a planetary gear set to a stationary member of a transmission to thereby allow engine braking of a vehicle, the method comprising:

identifying an operator commanded downshift requesting a manual downshift from second gear to a manual first gear;

releasing an off-going band clutch associated with second gear to thereby disconnect a sun gear member of the planetary gear set from the stationary member;

increasing an engine speed using electronic throttle control until a relative speed across the SOWC reaches approximately zero;

engaging the SOWC to thereby connect the carrier member to the stationary member after the relative speed across the SOWC reaches approximately zero such that minimal impact load is absorbed during engagement of the SOWC;

reducing the engine speed after the SOWC is engaged such that the engine braking is enabled and the vehicle decelerates in the manual first gear; and releasing the SOWC after the engine braking is complete.

15. The method of claim 14, wherein said engaging the SOWC includes hydraulically engaging the SOWC such that torque is held across the SOWC in both clockwise and counter-clockwise directions.

16. The method of claim 15, wherein increasing an engine speed using electronic throttle control until a relative speed across the SOWC reaches approximately zero includes monitoring a transmission input speed sensor and a transmission output speed sensor.

17. The method of claim 16, wherein said releasing the SOWC includes mechanically releasing the SOWC.

\* \* \* \* \*